United States Patent
Ito et al.

(10) Patent No.: US 10,920,631 B2
(45) Date of Patent: Feb. 16, 2021

(54) HEAD COVER FOR INTERNAL COMBUSTION ENGINE CYLINDER HEAD

(71) Applicants: Mahle International GmbH, Stuttgart (DE); Mahle Filter Systems Japan Corporation, Kawagoe (JP)

(72) Inventors: Daizo Ito, Tokyo (JP); Atsushi Nonaka, Tokyo (JP); Katsuhisa Ohta, Saitama (JP); Yuki Oyama, Saitama (JP)

(73) Assignees: Mahle Filter Systems Japan Corporation; Mahle International GmbH

( * ) Notice: Subject to any disclaimer, the term of this patent is extended or adjusted under 35 U.S.C. 154(b) by 0 days.

(21) Appl. No.: 16/556,204

(22) Filed: Aug. 29, 2019

(65) Prior Publication Data

US 2020/0072101 A1 Mar. 5, 2020

(30) Foreign Application Priority Data

Aug. 30, 2018 (JP) .............................. JP2018-162016

(51) Int. Cl.
*F01M 13/04* (2006.01)
*F02F 1/40* (2006.01)
(Continued)

(52) U.S. Cl.
CPC ......... *F01M 13/0416* (2013.01); *B60R 13/08* (2013.01); *F02F 1/40* (2013.01);
(Continued)

(58) Field of Classification Search
CPC ... F01M 13/04; F01M 2013/0461; F02F 1/40; F02F 7/008; F02F 1/00; F02B 77/00
See application file for complete search history.

(56) References Cited

U.S. PATENT DOCUMENTS

| 4,898,125 A | 2/1990 | Ampferer |
| 8,480,777 B2 * | 7/2013 | Sakaguchi ......... F01M 13/0416 55/464 |

(Continued)

FOREIGN PATENT DOCUMENTS

| CA | 2040076 C | 11/1995 |
| DE | 3730817 A1 | 3/1989 |

(Continued)

OTHER PUBLICATIONS

English abstract for JPH3124920.
German Search Report dated Feb. 28, 2020 related to corresponding German Patent Application No. 10 2019 212 697.9.

*Primary Examiner* — Long T Tran
(74) *Attorney, Agent, or Firm* — Fishman Stewart PLLC (57) ABSTRACT

A head cover structured and arranged to cover at least part of a face of a cylinder head of an internal combustion engine is described. The head cover includes a chamber formation part structured and arranged to provide a chamber to restrain sound propagating through air from the cylinder head. The chamber formation part includes a partition part for partitioning the chamber from a space on a cylinder head side. The partition part has a convex part projecting into the chamber, and a through hole may be provided in the convex part that penetrates from the space on the cylinder head side to the chamber.

19 Claims, 6 Drawing Sheets

(51) Int. Cl.
  *B60R 13/08* (2006.01)
  *F02F 7/00* (2006.01)
  *F16M 1/026* (2006.01)

(52) U.S. Cl.
  CPC .......... *F02F 7/006* (2013.01); *F02M 2200/09* (2013.01); *F16M 1/026* (2013.01)

(56) References Cited

U.S. PATENT DOCUMENTS

| | | | |
|---|---|---|---|
| 9,463,403 B2 * | 10/2016 | Wakabayashi | ......... F01M 13/04 |
| 2006/0169531 A1 | 8/2006 | Volker | |
| 2016/0333753 A1 * | 11/2016 | Nawa | ................. F01M 13/0416 |
| 2016/0363017 A1 * | 12/2016 | Nagai | ................ F01M 13/0416 |

FOREIGN PATENT DOCUMENTS

| | | |
|---|---|---|
| DE | 4011705 A1 | 10/1991 |
| DE | 4305281 C1 | 5/1994 |
| DE | 4304628 A1 | 8/1994 |
| DE | 20320100 U1 | 5/2005 |
| JP | H3-124920 A | 5/1991 |
| JP | H08-207833 A | 8/1996 |

\* cited by examiner

HEAD COVER FOR INTERNAL COMBUSTION ENGINE CYLINDER HEAD

CROSS-REFERENCE TO RELATED APPLICATION

This application claims priority to Japanese Application 2018-162016 filed on Aug. 30, 2018, the contents of each are hereby incorporated by reference in its entirety.

TECHNICAL FIELD

The present invention relates to a head cover for an internal combustion engine cylinder head.

BACKGROUND

A silencing device of a head cover for a cylinder head of an internal combustion engine comprising a chamber, and a resonator communicating with an inside of the chamber, in which the resonator is provided with a ventilation hole opened inside the head cover, is known (see Patent Literature 1). In such a constitution, noises generated from an active valve air hole are attenuated inside the head cover by the Helmholtz principle of resonance.

[Patent Literature 1]
Japanese Unexamined Patent Application Laid-Open No. H3-124920

SUMMARY

A head cover for an internal combustion engine cylinder head is arranged adjacent to a cylinder head. Normal oil is used for a smooth operation of an actuation component, in the cylinder head, and the oil may be splashed to the head cover by the actuation of the actuation component. In a constitution described in the above-mentioned Patent Literature 1, a ventilation hole is exposed to the oil, so that there is a possibility that an opening area of the ventilation hole is decreased by adhesion of the oil. When the opening area of the ventilation hole is decreased, it becomes difficult to properly obtain an attenuating effect of sound due to the Helmholtz principle of resonance.

Therefore, the present invention is made in view of the above-mentioned problems, and an object of the present invention is to continuously restrain sound emitted from the cylinder head by reducing influences of the oil on a sound attenuating effect by the Helmholtz principle of resonance.

To solve the above-mentioned problems, a head cover covering at least one part of an upper face of a cylinder head of an internal combustion has a chamber formation part for forming a chamber to restrain sound propagating through air from the cylinder head, and the chamber formation part has a partition part for partitioning a chamber from a space on the cylinder head side. The partition part has a convex part projecting into the chamber, and the convex part is provided with a through hole penetrating from the space on the cylinder head side to the chamber.

In this aspect, even if the oil flows to the chamber from the through hole, the oil flows down on a side face of the convex part, so that the oil can be kept from remaining in the through hole. Accordingly, the opening area of the through hole can be avoided from decreasing due to the oil, so as to continuously reduce sound generated by the cylinder head and emitted from a main cover.

The through hole may be provided at an uppermost part of the convex part. In this aspect, the oil can be further kept from remaining in the through hole.

The partition part may have a guide path for guiding the oil flowing to the chamber from the through hole at a lower end of the convex part, and the guide part may be inclined while the head cover is mounted to cover the cylinder head. In this aspect, the oil flowing from the through hole can be properly guided.

The chamber formation part may have a discharge hole for discharging the oil guided to the guide path from the chamber. In this aspect, the oil guided by the guide path can be kept from remaining in the chamber.

The through hole may have a corner part indented outward on an inner face. In this aspect, even when the oil is adhered to the through hole, the oil can be collected to the corner part by surface tension onto the inner face of the through hole and adhered to the corner part, so that an area of a round hole required to restrain sound can be properly secured.

According to the present invention, influences of the oil on an attenuating effect of the sound due to the Helmholtz principle of resonance are reduced, so that the sound generated at a cylinder head and emitted from a main cover can be continuously muffled.

BRIEF DESCRIPTION OF THE DRAWINGS

FIG. 4(a) is a diagram when
FIG. 3(a) is seen from a view point C.

DETAILED DESCRIPTION

Figure 1:
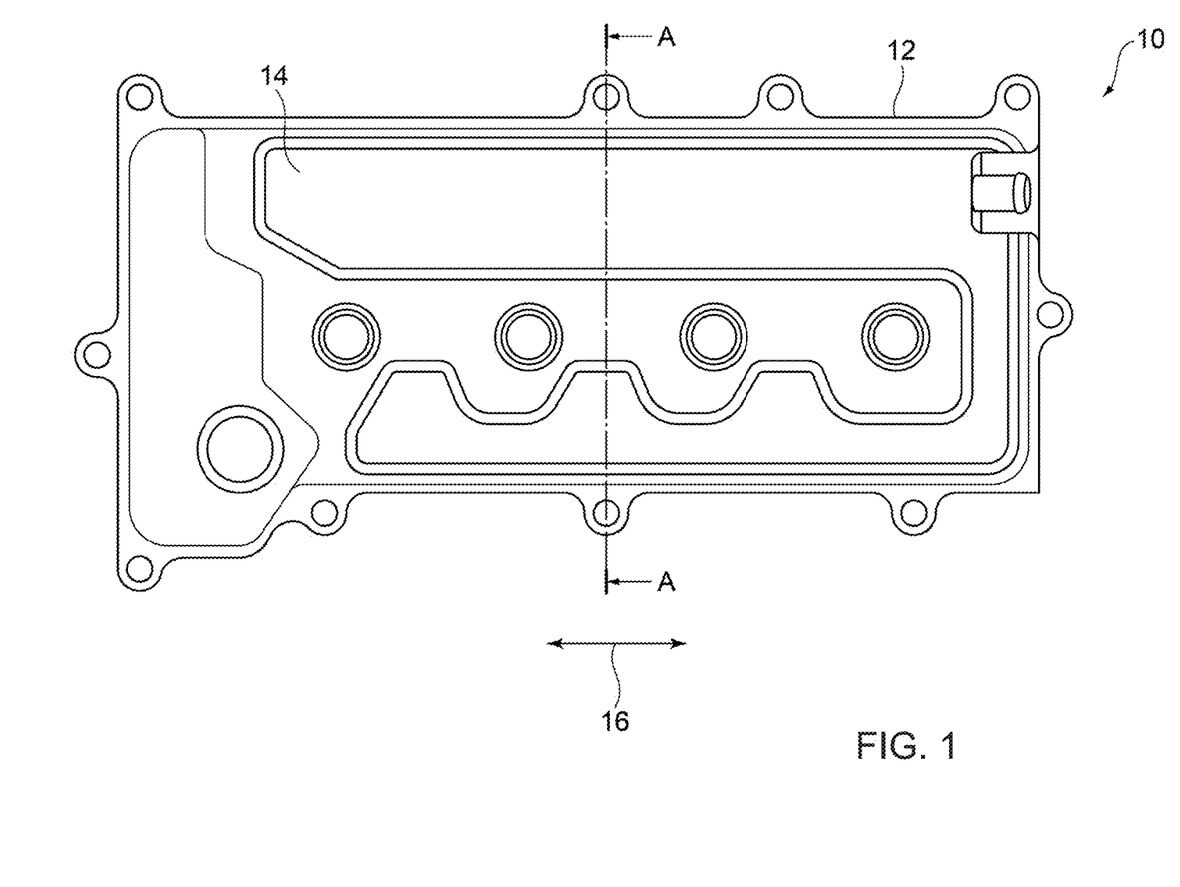
FIG. 1 is a top view of a head cover 10 in a first embodiment.

FIG. 1 is a top view of a head cover 10 in a first embodiment. The head cover 10 has a main cover 12 and a sub cover 14. The main cover 12 is formed into a sink-like shape having an almost rectangular outer shape seen from above. The sub cover 14 is formed into a U-shape seen from above, and two straight portions extending parallely are formed longer and wider than another straight portion. Hereinafter, an extension direction of the two straight portions of the sub cover 14, i.e., a direction of an arrow 16 in FIG. 1 is referred to as a "longitudinal direction".

Figure 2:
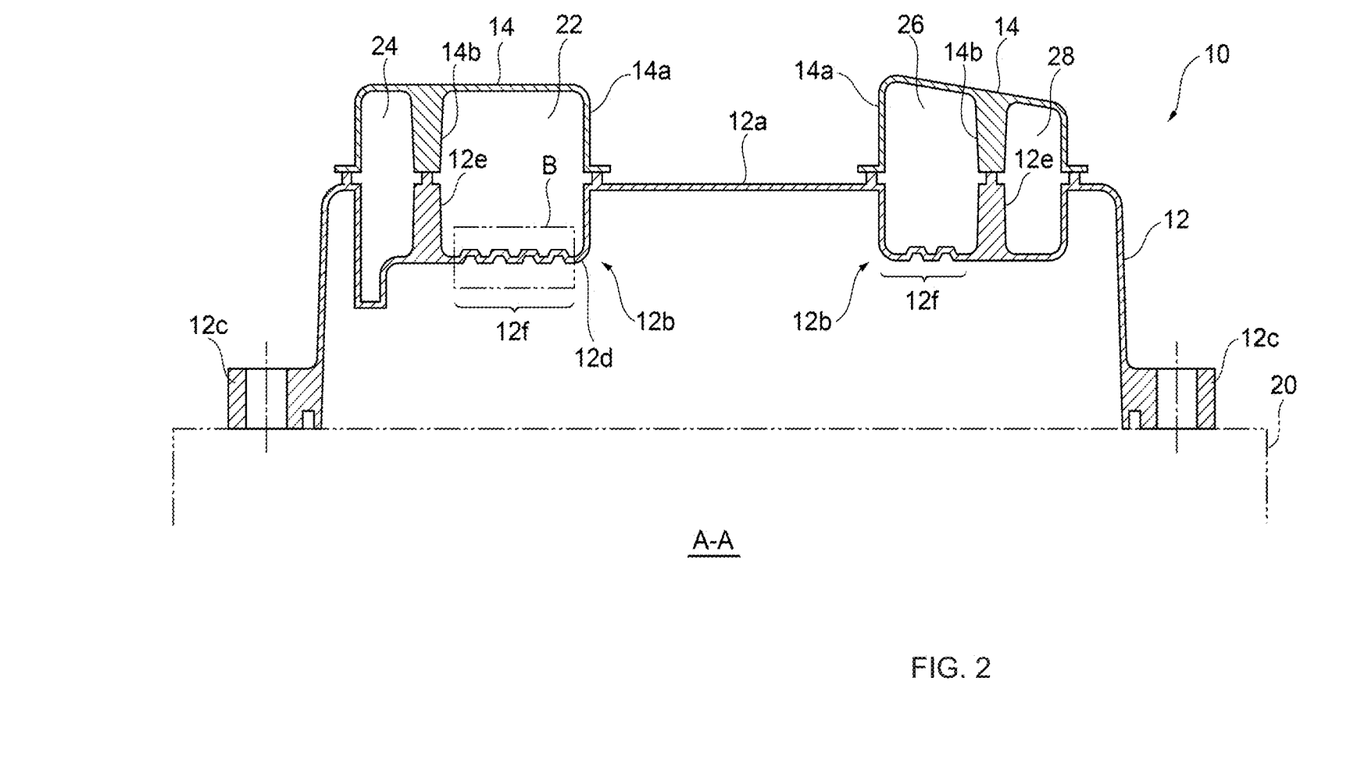
FIG. 2 is a cross section view along a line A-A of FIG. 1.

FIG. 2 is a cross section view along a line A-A of FIG. 1. For easy understanding, in FIG. 2, the cross section view along the line A-A of FIG. 1 is rotated by 90 degrees and shown as horizontally long. The head cover 10 is arranged at an upper part of a cylinder head 20, so that its opening is oriented to a lower part of the cylinder head 20. In this manner, the head cover 10 covers at least one part of the upper face of the cylinder head 20 of an internal combustion engine. The head cover 10 is mounted to the cylinder head 20 by a fastening tool such as a bolt inserted in a bolt boss 12c.

The main cover 12 has a body part 12a and a concave part 12b. The body part 12a almost defines an outer shape of the main cover 12, and is formed into a sink-like shape having an almost rectangular outer shape seen from above.

The concave part 12b has an outer shape almost the same as that of the sub cover 14, when seen from above. That is to say, the concave part 12b is formed in a U-shape when seen from above, and two straight portions extending parallely are formed longer and wider than another straight portion. The concave part 12b is formed to be indented downwardly from above at an entire portion of a U-shape, while the main cover 12 is mounted to cover the upper part of the cylinder head 20. A partition wall 12e is formed on the main cover 12. The partition wall 12e is formed into a plate-like shape, and extends perpendicularly upward from the upper face of the concave part 12b. The partition wall 12e extends across an entire area in a longitudinal direction of the main cover 12.

The sub cover 14 is mounted to the upper face of the main cover 12 by vibration adhesion, to cover the concave part 12b. The sub cover 14 has a cup-like part 14a and a partition wall 14b. The cup-like part 14a is formed to expand upwardly from below at the entire portion of the U-like shape, while it is mounted to the main cover 1. The partition wall 14b is formed into a plate-like shape, and extends perpendicularly downward from the inner face of the cup-like part 14a. The partition wall 14b extends across an entire area in a longitudinal direction of the sub cover 14.

When the sub cover 14 is mounted to the main cover 12, a lower end of the partition wall 14b of the sub cover 14 comes into contact with an upper end of a partition wall 12e of the main cover 12. Thereby, the cup-like part 14a and the partition wall 14b of the sub cover 14, and the concave part 12b and the partition wall 12e of the main cover 12 form a first chamber 22 and a first oil mist separator chamber 24 in one straight portion extending in an extension direction, and forms a second chamber 26 and a second oil mist separator chamber 28 at the other straight portion extending in the extension direction. At one remaining straight portion connecting the two straight portions, the first chamber 22 and the second chamber 26 are connected to each other, and the first oil mist separator chamber 24 and the second oil mist separator chamber 28 are connected to each other. At the remaining straight portion, one set or both sets of the first chamber 22 and the second chamber 26, and the first oil mist separator chamber 24 and the second oil mist separator chamber 28 may be separated from each other.

Concretely, the cup-like part 14a of the sub cover 14 functions as a partition part for partitioning the first chamber 22, the first oil mist separator chamber 24, the second chamber 26, and the second oil mist separator chamber 28 from an exterior space above the head cover 10. The concave part 12b functions as a partition part for partitioning the first chamber 22, the first oil mist separator chamber 24, the second chamber 26, and the second oil mist separator chamber 28 from a space on the head cover 10 side, i.e., an interior space between the head cover 10 and the cylinder head 20. The partition wall 14b of the sub cover 14 and the partition wall 12e of the main cover 12 functions as a partition part for partitioning the first chamber 22 and the first oil mist separator chamber 24, and partitioning the second chamber 26 and the second oil mist separator chamber 28.

The first oil mist separator chamber 24, and the second oil mist separator chamber 28 re-condense and collect the oil existing in a mist-like form in the interior space of the head cover 10. The function of the oil mist separator chamber is known, so its explanation is omitted.

The first chamber 22 and the second chamber 26 restrain the sound propagating through air from the cylinder head 20 by the Helmholtz principle of resonance. A technique for attenuating and restraining the sound according to the Helmholtz principle of resonance is well-known, so its explanation is omitted. The cup-like part 14a and the partition wall 14b of the sub cover 14, and the concave part 12b and the partition wall 12e of the main cover 12 function as a chamber formation part for forming the first chamber 22 and the second chamber 26 to restrain the sound propagating through the air from the cylinder head 20.

Also, any one of the cup-like part 14a of the sub cover 14 and the concave part 12b of the main cover 12 may not be provided, and one of the main cover 12 and the sub cover 14 may be formed flat. In this case, the first chamber 22 and the second chamber 26 may be formed.

The concave part 12b of the main cover 12 has a bottom part 12f. The bottom part 12f functions as a partition part for partitioning the first chamber 22 and the second chamber 26 from the space on the cylinder head 20 side. A through hole is provided at the bottom part 12f, as described below. The through hole is provided to restrain the sound for propagating through the air from the cylinder head 20 by the Helmholtz principle of resonance.

However, as shown in FIG. 2, the main cover 12 is arranged adjacent to the cylinder head 20. The cylinder head 20 has an operation component, and the oil may be spattered to the main cover 12 by an actuation of the actuation component. In the first embodiment, the bottom part 12f is arranged at a portion where a spattering amount of the oil from the cylinder head 20 is comparatively low. A possibility that the oil is spattered to the bottom part 12f provided with the through hole still remains. There is a possibility that when the oil is spattered to the bottom part 12f and an opening area of the through hole is reduced due to the adhesion of the oil, the attenuating effect of the sound by the Helmholtz principle of resonance cannot be properly obtained.

Figure 3A:
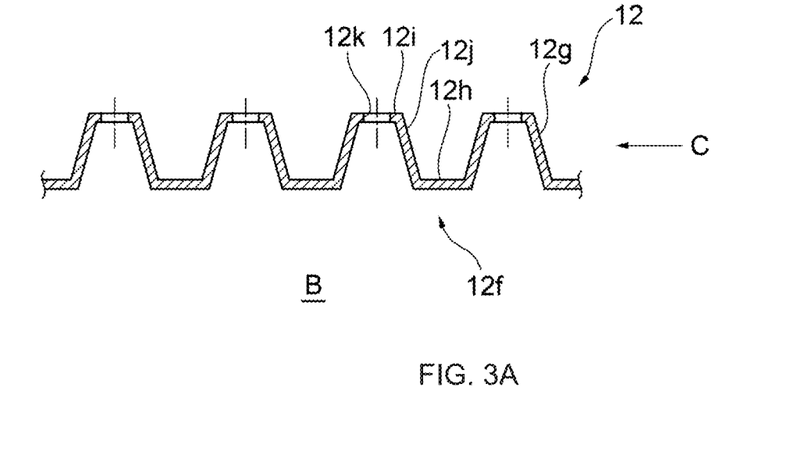
FIG. 3(a) is an enlarged view of an area B of FIG. 2.
Figure 3B:
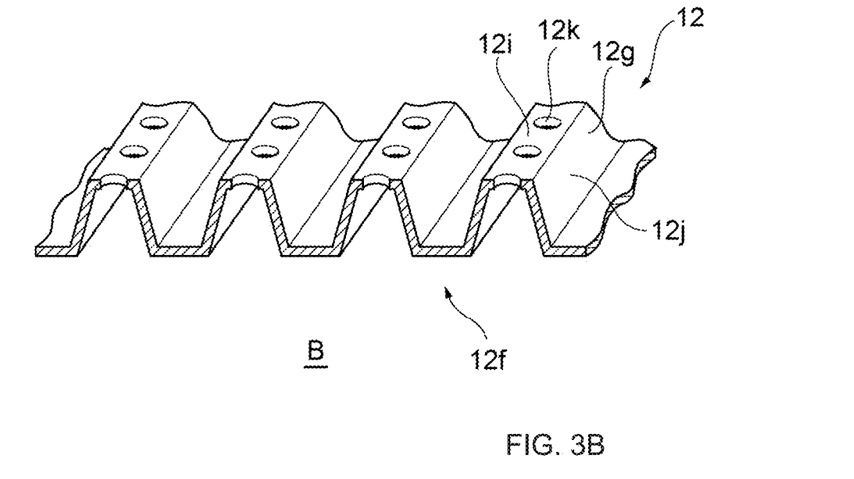
FIG. 3(b) is a perspective view of FIG. 3(a).

FIG. 3(a) is an enlarged view of an area B of FIG. 2, and FIG. 3(b) is a perspective view of FIG. 3(a). The bottom part 12f has plural convex parts 12g projecting into the first chamber 22 and the second chamber 26. Plural through holes 12k from the space on the cylinder head 20 side to the first chamber 22 and the second chamber 26 are provided at each convex part 12g.

Each convex part 12g has a peak face 12i and four side faces 12j. The peak face 12i is an uppermost part of the convex part 12g, and formed into a horizontal flat shape. The side face 12j is inclined, so that the width of the convex part 12g becomes larger to the bottom.

In this manner, the through hole 12k is provided at the convex part 12g. Even if the oil flows into the first chamber 22 or the second chamber 26 from the through hole 12k, the oil flows down on the side face 12j of the convex part 12g, so that the oil can be kept from remaining in the through hole 12k. Accordingly, reduction of the opening area of the through hole 12k due to the oil can be avoided, so as to continuously reduce the sound generated by the cylinder head 20 and emitted from the main cover 12. The through hole 12k is provided at the peak face 12i of the convex part 12g. Thereby, the oil can be further kept from remaining in the through hole 12k.

In the first embodiment, each convex part 12g extends in a longitudinal direction, and is aligned in a direction vertical to the longitudinal direction. Plural through holes 12k are aligned on one straight line at the uppermost part of each convex part 12g. Of course, the shape of the convex part 12g is not limited to such a shape.

Figure 4A:
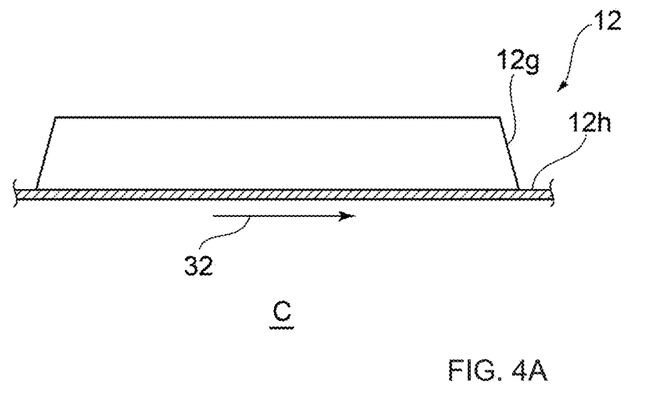
Figure 4B:
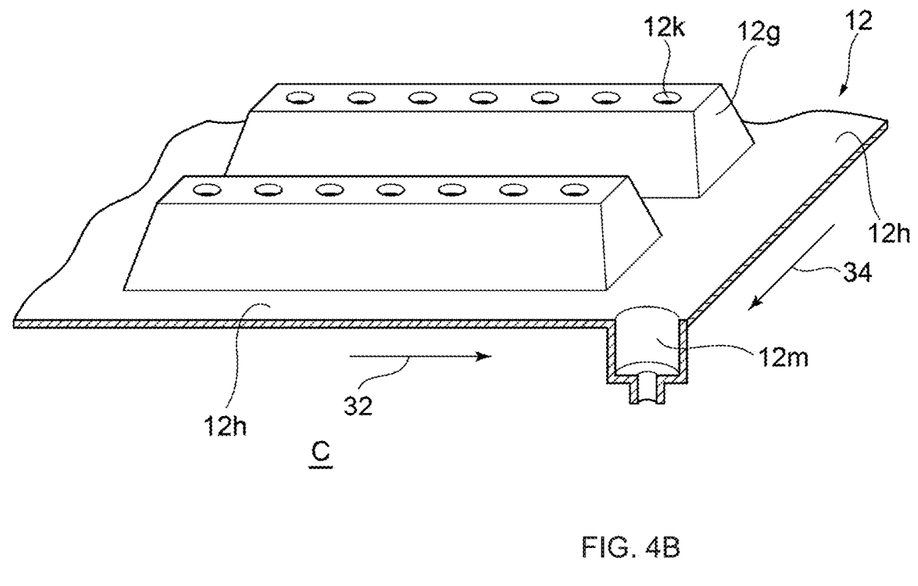
FIG. 4(b) is a perspective view of FIG. 4(a).

FIG. 4(a) is a diagram when FIG. 3(a) is seen from a view point C. FIG. 4(b) is a perspective view of FIG. 4(a). A bottom part 12f of the main cover 12 has a guide path 12h. The guide path 12h is provided at a lower end of the convex part 12g, and guides the oil flowing into the first chamber 22 and the second chamber 26 from the through hole 12k. Concretely, the guide path 12h is inclined downwardly as it goes in directions of an arrow 32 of FIG. 4(a) and arrows 32, 34 of FIG. 4(b), while the head cover 10 is mounted to cover the cylinder head 20. Furthermore, the bottom part 12f of the main cover 12 has a discharge hole 12m for discharging the oil guided to the guide path 12h from the chamber. Thereby, the oil flowing into the first chamber 22 or the second chamber 26 from the through hole 12k can be guided through the guide path 12h, and properly discharged to outside of the first chamber 22 or the second chamber 26 from the discharge hole 12m.

Figure 5:
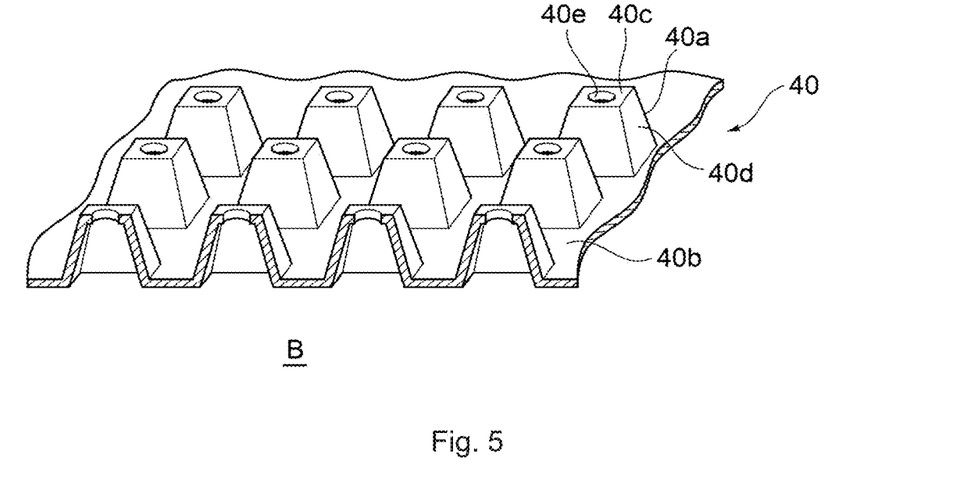
FIG. 5 is a diagram showing a bottom part 40 of a concave part of a main cover in a second embodiment.

FIG. 5 is a diagram showing a bottom part 40 of a concave part of a main cover in a second embodiment. The head cover in the second embodiment is similar to the head cover 10 in the first embodiment, except that the bottom part 40 is formed instead of the bottom part 12f.

The bottom part 40 has plural convex parts 40a and guide paths 40b. In the second embodiment, one through hole 40e is provided to each of the plural convex parts 40a. The convex part 40a has a peak face 40c and four side faces 40d. Also, in the second embodiment, the peak face 40c is an uppermost part of the convex part 40a, and is formed into a horizontal flat shape. The side face 40d is inclined, so that the width of the convex part 40a becomes larger to the bottom. In the second embodiment, the peak face 40c is formed into an almost square shape, and the side faces 40d are formed into almost the same trapezoidal shape.

In this manner, one through hole 40e is provided at each of the plural convex parts 40a, so that the oil flowing from the through hole 40e can flow down on the more side faces 40d. Therefore, the flow of the oil from the through hole 40e can be promoted, so as to restrain reduction of the opening area of the through hole 40e due to the oil. It is similar to the first embodiment, that the guide path 40b is provided at the lower end of the convex part 40a to guide the oil flowing into the first chamber 22 and the second chamber 26 from the through hole 40e.

Figure 6A:
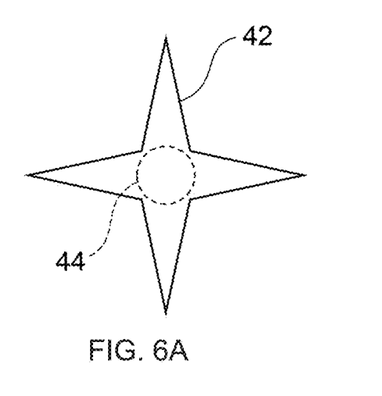
FIGS. 6(a) to 6(c) are diagrams showing variation examples of a through hole provided at a convex part.
Figure 6B:
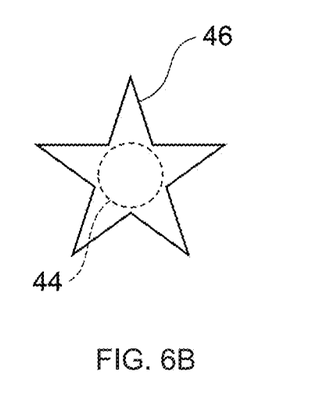
Figure 6C:
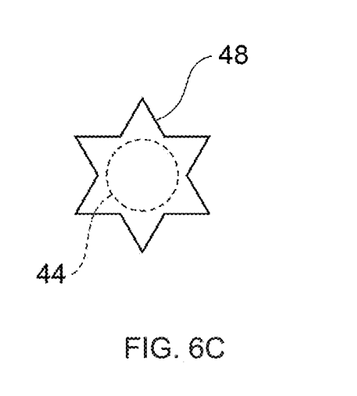

FIG. 6(a) to FIG. 6(c) are diagrams showing variation examples of a through hole provided at a convex part. In these variation examples, the through hole provided at the convex part is formed to house a round hole with a diameter required to restrain sound according to the Helmholtz principle of resonance (hereinafter referred to as a "standard hole"), and to have a corner part indented outward on an inner face. The diameter of the standard hole is obtained by a test or analysis according to a size or shape of the first chamber 22 and the second chamber 26.

In a variation example, as shown in FIG. 6(a), the through hole 42 provided at the convex part is formed to house the standard hole 44 and has four corner parts. The four corner parts are formed at a tip of a triangle shape radially extending and tapered in four directions with the standard hole 44 as a center. That is to say, the through hole 42 is formed into a throwing star having four blades.

In another variation example, as shown in FIG. 6(b), the through hole 46 provided at the convex part is formed to house the standard hole 44, and has five corner parts. The five corner parts are formed at a tip of a triangle shape radially extending and tapered in five directions with the standard hole 44 as a center. That is to say, the through hole 46 is formed into a star-like shape.

In further variation example, as shown in FIG. 6(c), the through hole 48 provided at the convex part is formed to house the standard hole 44 and have six corner parts. The six corner parts are formed at a tip of a triangle shape radially extending and tapered in six directions with the standard hole 44 as a center. That is to say, the through hole 46 is formed into a six-rayed star-like shape.

In this manner, the through hole has the corner parts. Even when the oil is adhered to the through hole, the oil can be collected to the corner part by surface tension onto the inner face of the through hole and adhered to the corner part, so that the standard hole 44 can be avoided from being blocked by the oil and an area of the standard hole 44 can be properly secured. Therefore, it can be avoided that a sound restraining effect is reduced due to the adhesion of the oil onto the through hole.

In another variation example, the main cover does not have the concave part 12b and the partition wall 12e of the main cover in the first embodiment, and has the cup-like part 14a and the partition wall 14b of the sub cover 14, instead. Also, the sub cover has the concave part 12b and the partition wall 12e of the main cover 12 in the first embodiment. The sub cover is mounted from the bottom of the main cover, to cover the cup-like part of the main cover. In this aspect, a chamber for restraining sound propagating through the air from the cylinder head 20 can be formed.

The present invention is explained with reference to the embodiments as above, but the present invention is not limited to the above-mentioned embodiments, and includes proper combinations or replacements of constitutions in the embodiments. Also, it is possible to make variations such as proper alterations of the combination or processing order and various design changes in the embodiment based on a knowledge of those skilled in the art, and the embodiments with such variations may be included in the scope of the present invention.

The invention claimed is:

1. A head cover for covering at least part of an upper face of a cylinder head of an internal combustion engine, comprising:
    a chamber formation part structured and arranged to provide a chamber to restrain sound propagating through air from the cylinder head;
    the chamber formation part including a partition part for partitioning the chamber from a space on a cylinder head side; and
    wherein the partition part has a convex part projecting into the chamber, the convex part provided with a through hole penetrating from the space on the cylinder head side to the chamber, and wherein the through hole is provided at an uppermost part of the convex part relative to the cylinder head.

2. The head cover according to claim 1, wherein the partition part has a guide path for guiding oil flowing into the chamber from the through hole at a lower end of the convex part relative to the cylinder head, and
    wherein the guide path is inclined when the head cover is mounted to cover the cylinder head.

3. The head cover according to claim 2, wherein the chamber formation part has a discharge hole for discharging the oil guided to the guide path from the chamber.

4. The head cover according to claim 2, wherein the through hole has a corner part indented outward on an inner face.

5. The head cover according to claim 1, wherein the through hole has a corner part indented outward on an inner face.

6. The head cover according to claim 5, wherein the through hole has a star-like shape.

7. The head cover according to claim 1, wherein the convex part has a peak face and a plurality of side faces extending from the peak face that are inclined outwards in a direction away from the chamber, and wherein the through hole is provided in the peak face.

8. The head cover according to claim 5, wherein the partition part has a guide path for guiding oil flowing into the chamber from the through hole at a lower end of the convex part disposed opposite to the uppermost part, and wherein the guide path is inclined when the head cover is mounted to cover the cylinder head.

9. The head cover according to claim 8, wherein the chamber formation part has a discharge hole for discharging the oil guided to the guide path from the chamber.

10. An internal combustion engine, comprising:
a cylinder head;
a head cover structured and arranged to cover at least part of an upper face of the cylinder head, the head cover including a chamber formation part structured to provide a chamber to restrain sound propagating through air from the cylinder head;
the chamber formation part including a partition part structured and arranged to partition the chamber from a space on a cylinder head side;
wherein the partition part has a convex part projecting into the chamber, the convex part provided with a through hole penetrating from the space on the cylinder head side to the chamber, and wherein the through hole is provided at an uppermost part of the convex part relative to the cylinder head.

11. The internal combustion engine according to claim 10, wherein the through hole has a corner part indented outward on an inner face.

12. The internal combustion engine according to claim 10, wherein the partition part has a guide path for guiding oil flowing into the chamber from the through hole at a lower end of the convex part disposed opposite to the uppermost part.

13. The internal combustion engine according to claim 12, wherein the guide path is inclined when the head cover is mounted to cover the cylinder head.

14. The internal combustion engine according to claim 12, wherein the chamber formation part has a discharge hole for discharging the oil guided to the guide path from the chamber.

15. The internal combustion engine according to claim 10, wherein the convex part has a peak face and a plurality of side faces, and wherein the through hole is provided in the peak face and the plurality of side faces are inclined such that a width of the convex part becomes larger in a direction towards the cylinder head.

16. The internal combustion engine according to claim 15, wherein the partition part has a guide path for guiding oil flowing into the chamber from the through hole at a lower end of the convex part disposed opposite to the uppermost part, and wherein the guide path is inclined when the head cover is mounted to cover the cylinder head.

17. The internal combustion engine according to claim 16, wherein the chamber formation part has a discharge hole for discharging the oil guided to the guide path from the chamber.

18. A head cover covering at least part of an upper face of a cylinder head of an internal combustion engine, comprising:
a chamber formation part structured and arranged to provide a chamber to restrain sound propagating through air from the cylinder head;
the chamber formation part including a partition part for partitioning the chamber from a space on a cylinder head side;
the partition part has a convex part projecting into the chamber, the convex part provided with a through hole penetrating from the space on the cylinder head side to the chamber; and
wherein the through hole is provided at an uppermost part of the convex part relative to the cylinder head, and wherein the through hole has a plurality of corner parts indented and tapered outward on an inner face.

19. The head cover according to claim 18, wherein the partition part has a guide path for guiding oil flowing into the chamber from the through hole at a lower end of the convex part relative to the cylinder head.

* * * * *